United States Patent [19]

Hosokawa

[11] 4,400,038
[45] Aug. 23, 1983

[54] QUICK-RELEASE TYPE HUB FOR BICYCLES

[75] Inventor: Mikio Hosokawa, Osaka, Japan

[73] Assignee: Maeda Industries, Ltd., Osaka, Japan

[21] Appl. No.: 290,337

[22] Filed: Aug. 5, 1981

[30] Foreign Application Priority Data

Aug. 6, 1980 [JP] Japan ............................... 55-108524

[51] Int. Cl.³ ........................ B60B 27/02; B60B 35/00
[52] U.S. Cl. .................................... 301/111; 301/125;
280/288
[58] Field of Search .............................. 301/111–112,
301/124 R, 125, 105 R; 280/279, 288

[56] References Cited

U.S. PATENT DOCUMENTS 2,677,984 5/1954 Juy .................................. 280/288 X
4,028,915 6/1977 Stahl ............................... 280/279 X

FOREIGN PATENT DOCUMENTS 995747 12/1951 France ................................ 301/125
51-10525 3/1976 Japan .
658011 10/1951 United Kingdom ................ 301/125
658726 10/1951 United Kingdom ................ 301/125

Primary Examiner—Charles A. Marmor
Attorney, Agent, or Firm—Birch, Stewart, Kolasch & Birch

[57] ABSTRACT

A quick-release type hub for bicycles comprises a hub shell journalled on a stationary tubular axle through which extends a slidable spindle, at one end of which a cam lever is mounted co-axially rotatably with an actuating member which includes a clamping edge section and a releasing edge section; an elastically deformable spring washer interposed between the actuating member and a push member slidably mounted on the spindle, so that the push member is prevented from sliding axially outwardly as long as the clamping edge section is in contact with the spring washer; and the spindle being axially slidable only when the releasing edge section is in contact with the spring washer.

8 Claims, 12 Drawing Figures

QUICK-RELEASE TYPE HUB FOR BICYCLES

BACKGROUND AND SUMMARY OF THE INVENTION

This invention relates to a bicycle hub, and more particularly to an improvement in a bicycle hub of the quick-release type which is designed so as to be detachable from and re-attachable to a pair of fork ends rigidly secured to bicycle frame tubes. This type of bicycle hub is typically utilized in a road racing type bicycle which is so designed that a wheel can be instantly replaced with a new one when a tire is punctured or the wheel is damaged during the race. The quick-release type hub is also utilized in a collapsible type bicycle which is so designed that, after roughly disassembled, it can be packed in a bag or the like container so as to be easily carried into a car, a bus, a train, an airplane or other private or public transportation apparatus.

The conventional quick-release type hub, as disclosed for example in Japanese Utility Model Publication No. 51-10525, generally includes a stationary tubular hub axle, an axially slidable center spindle passing through the hub axle and having at one end an enlarged cylindrical head in which an oval through hole is formed extending transversely of the longitudinal axis of the spindle, a stationary cap member capped on the enlarged head of the slidable spindle and having a circular through hole extending in the same direction as the oval through hole, an adjusting nut mounted on the other end (threaded end) of the spindle, and a cam lever having a non-eccentric annular flange and an eccentric actuating shaft which extends through the oval through hole as well as the circular through hole in such a manner that the eccentric actuating shaft cooperates with the oval through hole of the spindle head while the non-eccentric annular flange of the cam lever cooperates with the circular through hole of the stationary cap member, so that, when the lever is turned, the spindle is axially moved back and forth through the eccentric motion of the actuating shaft. The hub also includes a pair of lock nuts (a first lock nut and a second lock nut) each of which is mounted on the opposite ends of the spindle, respectively, so as to cooperate with the adjusting nut and the enlarged head of the spindle in order that one fork end can be tightly sandwiched between the second lock nut and the adjusting nut while the other fork end can be tightly sandwiched between the first lock nut and the spindle head. The adjusting nut serves to adjust the clamping forces applied to the fork ends.

In the conventional quick-release type hub as above-described, the eccentric actuating shaft is directly associated with the enlarged cylindrical head of the slidable spindle and thus, turning motion of the cam lever is directly transmitted to the spindle head so as to urge the spindle axially. Naturally, when the cam lever is turned by a certain angle from its clamping position toward its releasing position, a distance between the spindle head and the first lock nut as well as a distance between the adjusting nut and the second lock nut are simultaneously enlarged in dependence upon the angular motion of the lever. As a result, when the cam lever happens to get in contact with something, for example a certain portion of a competitor's bicycle during the race, the hub is unexpectedly disengaged from the fork ends. Especially when the hub of a front wheel is disengaged from the fork ends of a bicycle running at a high speed, a serious accident may happen.

Accordingly, it is an object of the invention to eliminate the above-discussed disadvantage in the prior art devices.

Another object of the invention is to provide an improved quick-release type hub for bicycles which promotes safety by preventing unexpected disengagement of the hub from the fork ends.

A further object of the invention is to provide an improved quick-release type hub for bicycles which maintains its clamping function with respect to the fork ends for safety's sake until a cam lever is turned beyond a predetermined angle.

These and other objects, advantages, and features of the invention will become more apparent from the detailed description given hereinafter in connection with the accompanying drawings. It should be understood, however, that the detailed description and specific examples, while indicating preferred embodiments of the invention, are given by way of illustration only, since various changes and modifications within the spirit and scope of the invention will be apparent to those skilled in the art from this detailed description and illustration.

DESCRIPTION OF THE PREFERRED EMBODIMENTS

Figure 1:
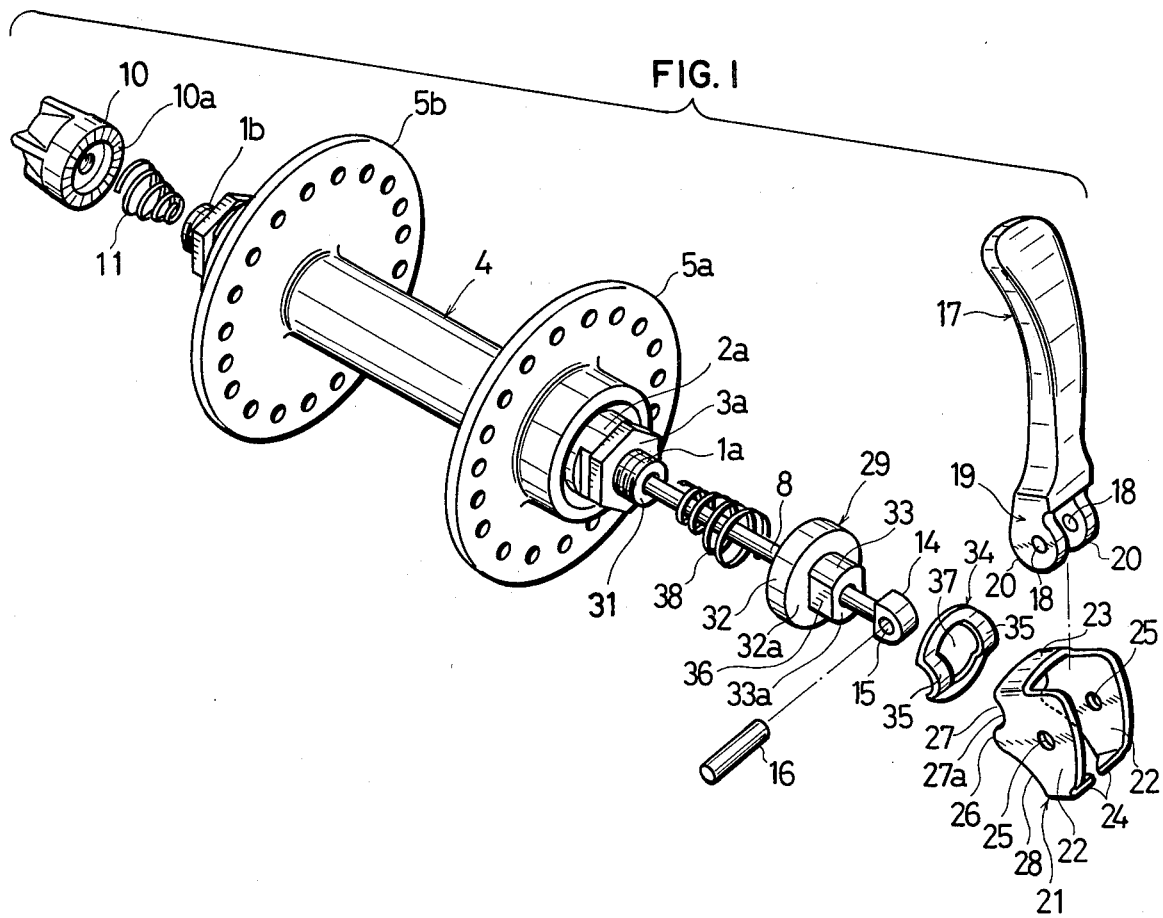
FIG. 1 is an exploded perspective view showing one embodiment of the invention.

Referring now to the drawings, in particular to FIGS. 1 to 6 showing the first embodiment of the present invention, there is illustrated a stationary tubular hub axle 1 which extends through an axial bore 4a of a hub shell 4. The axle is larger in length than the hub shell and thus the threaded end sections 1a, 1b of the axle project at opposite ends out of the hub shell. A first bearing cone 2a is mounted on the threaded end section 1a and held stationary there by means of a first lock nut 3a which bears against the outer end wall of the cone 2a. A second bearing cone 2b is likewise mounted on the other threaded end section 1b and held stationary there by means of a second lock nut 3b which bears against the outer end wall of the cone 2b.

The hub shell 4 has a pair of spoke flanges 5a, 5b and a pair of internal race portions 6a, 6b formed integrally at opposite ends thereof. A first series of steel balls 7a are interposed between raceways of the cone 2a and the race portion 6a, while a second series of steel balls 7b are interposed between raceways of the cone 2b and the race portion 6b. so that the hub shell 4 is supported by the two series of balls 7a, 7b for free rotation about the axle 1.

A center spindle 8, which is longer than the axle 1, passes through the tubular axle 1 and projects at opposite ends therefrom. The spindle is disposed so as to be axially slidable with respect to the stationary axle 1. One end of the spindle 8 is formed with a threaded end section 9 on which an adjusting nut 10 is mounted. Between an internal wall of the nut 10 and one end wall of the axle 1 there is interposed a first coil spring 11 for preventing undesirable loosening of the nut 10. An annular end wall 10a of the nut may preferably be serrulated for better friction, as shown in FIG. 1.

Figure 2:
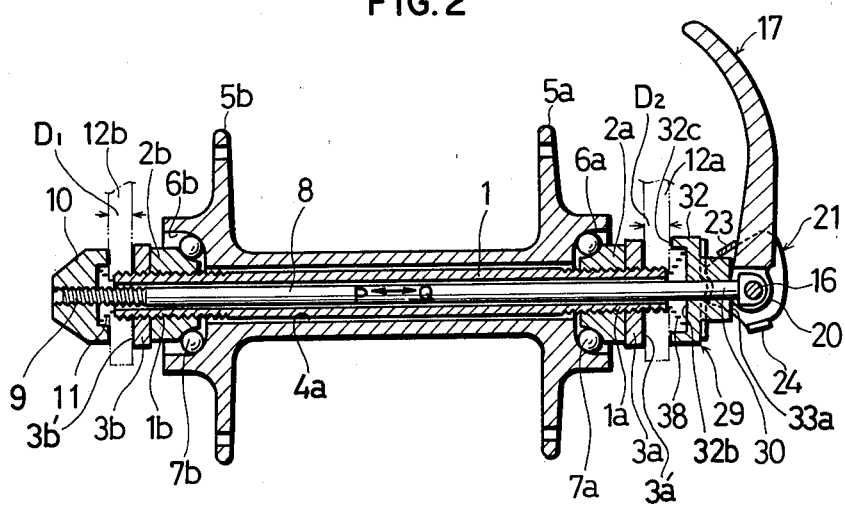
FIG. 2 is a longitudinal section of the assembled hub of FIG. 1.

A pair of elements shown in phantom lines and designated by reference numerals 12a,12b in FIG. 2 are a first fork end 12a and a second fork end 12b, both known per se, which are fixedly connected to a pair of known bicycles frame tubes, only one tube 13a of which is shown in phantom line in FIGS. 3 to 6.

The construction and arrangement of all the elements as described hereinbefore are well known to those skilled in the art and, therefore, it should be noted that important features of the present invention reside in the specific construction and arrangement of the following elements.

The other end of the center spindle 8 is formed with an integral enlarged head 14 having a through hole 15 extending transversely of the longitudinal axis of the spindle. A support pin 16 extends through the hole 15 and projects at opposite ends from the hole 15. An operating lever 17 is pivotally supported by the pin 16 inserted through the hole 15 as well as a pair of mounting holes 18 formed in a forked end 19 of the lever, so that the lever is movable about the pin within a predetermined range.

Figure 3:
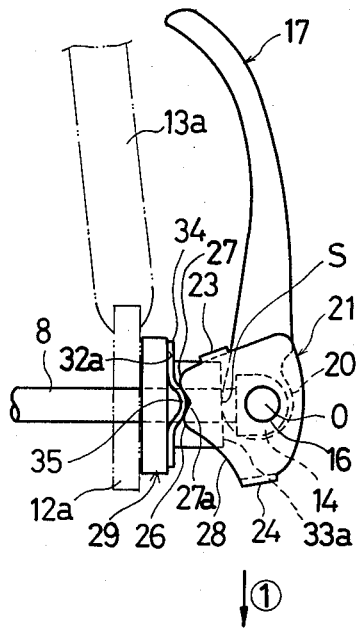
FIGS. 3 to 6 are schematic illustrations showing operational stages of the hub of FIG. 1.
Figure 6:
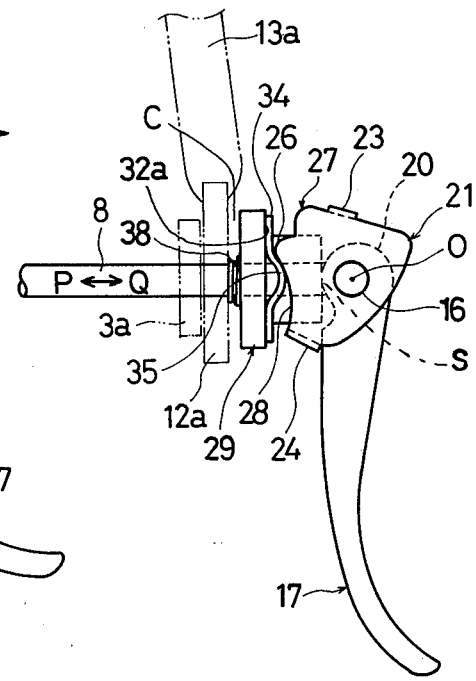
Figure 7:
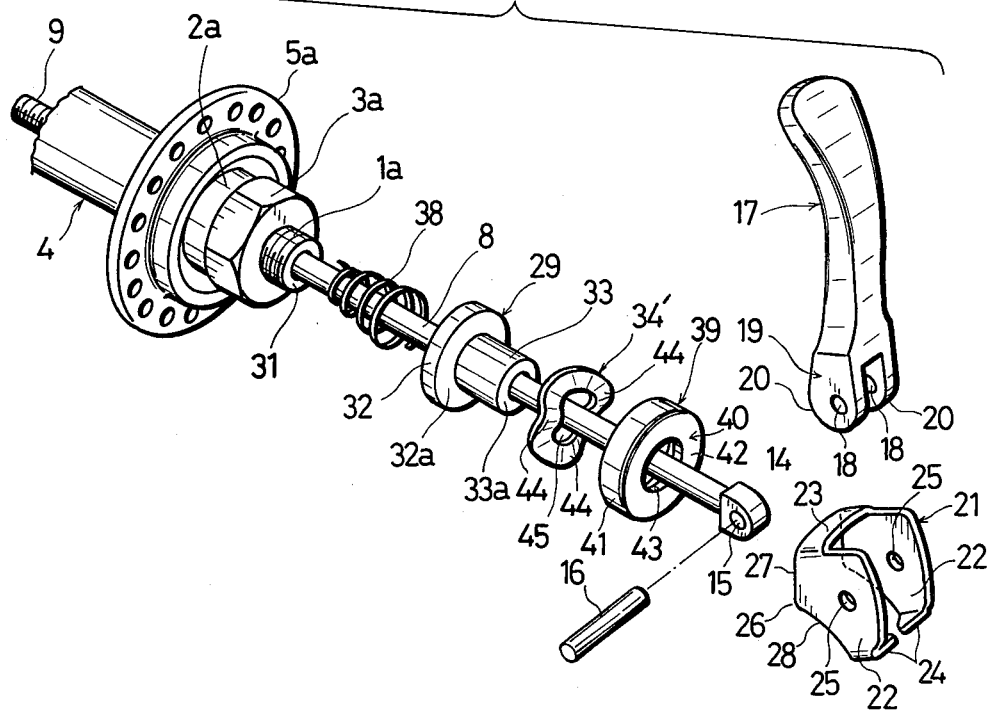
FIG. 7 is an exploded perspective view, partly broken away, showing another embodiment of the invention.

The forked end 19 has a pair of round surfaces 20 serving as cam surfaces which act on and cooperate with an end wall 33a of a push member 29 as will be hereinafter described. Each of the cam surfaces 20 is so shaped that a distance between an action point on the cam surface and the center (O) of the mounting hole 18 is varied as the lever 17 is angularly moved. More specifically, each of the cam surfaces 20 is so formed that, when the lever 17 is in its clamping position as shown in FIG. 3, maximized is the distance between the center (O) and a contact point (S) where the cam surfaces 20 and the end wall 33a are in contact with each other, and that, when the lever is in its releasing position as shown in FIG. 6, the distance between the center (O) and the contact point (S) is minimized.

Further, there is provided a specific actuating member 21 which may be formed of a sheet metal by bending the same so as to provide a pair of spaced side plates 22, a first actuator preferably in the form of a cross plate 23 disposed at one marginal extremity of the side plates, the cross plate 23 extending transversely of the longitudinal axis of the spindle 8 and being connected at both ends to the spaced side plates 22, a second actuator preferably in the form of a pair of opposed cross extensions 24 extending at a right angle to the side plates 22 and in parallel with the cross plate 23. The extensions 24 may preferably be disposed at a certain marginal extremity substantially opposite to the aforesaid extremity where the cross plate 23 is disposed. The cross plate 23 is so arranged that it can be pushed counter-clockwise when the lever 17 is turned in the same direction to a certain predetermined position (clamping position), while the cross extentions 24 are so arranged that they can be pushed clockwise when the lever 17 is turned clockwise to a certain predetermined position (releasing position).

Each of the side plates 22 has a mounting hole 25 through which the pin 16 extends and projects at opposite ends therefrom, so that the actuating member 21 is pivotally mounted on the projecting ends of the pin 16. Each of the side plates 22 further includes an inward edge which is separated by a nose point 26 into two sections, that is, a clamping edge section 27 which is disposed adjacent to the first actuator or cross plate 23 and arranged so as to be faced against the spring washer 34 when the lever 17 is in its clamping position as shown in FIG. 3, and a releasing edge section 28 which is disposed adjacent to the second actuator or cross extensions 24 and arranged so as to be faced against the spring washer 34 when the lever 17 is in its releasing position as shown in FIG. 6. The clamping edge section 27 may preferably be formed with a slightly concaved recess 27a for the purpose to be hereinafter described. The internal space of the actuating member 21 should be so determined that the forked end 19 of the lever can be housed therein when the lever 17 and the member 21 are pivotally mounted to the spindle head 14 by the aid of the support pin 16.

A flanged push member 29 with an axial center bore is mounted on the non-threaded end section 30 of the spindle 8 so as to be axially slidable back and forth within a limited space formed between the forked end 19 of the lever and one end wall 31 (FIG. 1) of the axle 1. The push member 29 may include a flange or enlarged section 32 and a reduced section 33 which is integral with and projecting from the enlarged section 32 toward the spindle head 14. The enlarged section 32 may be a disk-like member having a substantially annular outer vertical wall 32a, while the section 33 has a substantially annular vertical end wall 33a. The enlarged section 32 further includes an annular inner wall 32c (FIG. 2) which may preferably be serrulated for better friction.

Between the inward marginal edges of the side plates 22 and the vertical wall 32a of the section 32 there is sandwiched a spring washer 34 which is mounted on the reduced section 33. The spring washer 34 may be of the type that has a pair of spaced outwardly deformed or protruded portions 35 each engageable with the recess 27a of each side plate. In order to properly hold the portions 35 against the recesses 27a, the washer 34 should be prevented from undesirably moving about the spindle 8. For this purpose, the reduced section 33 may preferably be formed with at least one flat side wall 36 (FIG. 1), while the washer 34 may be formed with such a hole 37 having specific size and configuration as can meet with those of the reduced section 33.

Between the inward marginal edge of the side plates 22 and the end wall 31 of the axle 1, a second coil spring 38 is interposed so that the push member 29 is always urged axially outwardly to keep the end wall 33a in contact with the cam surfaces 20.

In order to assemble the above-described elements together to provide the bicycle hub according to the present invention, the tubular axle 1 is inserted into the axial bore 4a of the hub shell 4 so that the threaded end sections 1a,1b of the axle are exposed out of the opposite ends of the hub shell. Then, the first bearing cone 2a and the lock nut 3a are mounted on the end section 1a, with balls 7a interposed between the cone 2a and the race portion 6a, while the second bearing cone 2b and the lock nut 3b are likewise mounted on the other end section 1b, with the balls 7b interposed between the cone 2b and the race portion 6b. On the other hand, the lever 17 and the actuating member 21 may preferably be mounted, beforehand, to the spindle head 14 by inserting the pin 16 through the holes 25,18,15 and then fixing it, for example, by calking the opposite ends of the pin. Then, after the spring washer 34, the push member 29, and the second coil spring 38 are mounted in order on the spindle 8 by insertion, the spindle is inserted into the hollow axle 1 until its threaded end section 9 projects out of the axle end 1b. Then, the adjusting nut 10 is screwed on the threaded end section 9 of the spindle, with the first coil spring 11 interposed between the nut 10 and the end wall of the axle 1. Thus, bu turning the nut 10, it is possible to adjust a distance between the serrulated annular end wall 10a and the outer end wall 3b' of the lock nut. On the other hand, it should be noted that the push member 29 is mounted on the spindle 8 so as to be axially slidable within a predetermined range against the elasticity of the coil spring 38. It is also to be noted that the lever 17 can rotate about the pin 16, for example, in approximately 180 degrees, while the actuating member 21 can also rotate about the pin 16 within a predetermined range.

In order to attach the hub of the invention to a pair of fork ends 12a,12b, rigidly secured to the bicycle frame tube, the adjusting nut 10 is loosened so that a distance ($D_1$) between the serrulated annular wall 10a of the nut 10 and the outer end wall 3b' of the second lock nut 3b as well as a distance ($D_2$) between the serrulated annular end wall 32c of the push member 29 and the outer end wall 3a' of the first lock nut 3a are increased enough so that the second fork end 12b can be easily disposed between the nuts 10 and 3b while the first fork end 12a can also be easily disposed between the member 29 and the nut 3a. Then, after the lever 17 is turned to its clamping position (FIG. 3), the adjusting nut 10 is tightened until the fork end 12b is tightly sandwiched between the nuts 10 and 3b with sufficient frictional force while the other fork end 12a is also tightly sandwiched between the member 29 and the nut 3a with sufficient frictional force, as illustrated in FIG. 2.

In operation, when the lever 17 is in its clamping position where the distance between the points (O) and (S) is maximized and the lever is held in position by means of the end wall 33a of the member 29 as shown in FIG. 3, the spring washer 34 is held compressed between the wall 32a of the push member 29 and the clamping edge section 27 of the actuating member 21. Thus, the compressed spring washer 34 is elastically in tight contact with the sections 27, and more particularly, the protruded portions 35 of the washer 34 is in tight engagement with the recesses 27a of the member 21, thereby preventing the member 21 from moving about the pin 16. It should be noted that the member 21 maintains its position of FIG. 1 unless the lever 17 is turned excessively over a predetermined range of angle $\alpha_1$ (FIG. 5), for example over 150°. In other words, in the case where the lever is unexpectedly turned in less than the predetermined angle $\alpha_1$, the member 21 can be held stationary in position even if the cam surfaces 20 get out of contact with end wall 33a as shown in FIG. 5, with the result that the fork end 12a remains tightly sandwiched between the member 29 and the lock nut 3a while the other fork end 12 also remains tightly sandwiched between the nuts 10 and 3b.

Figure 4:
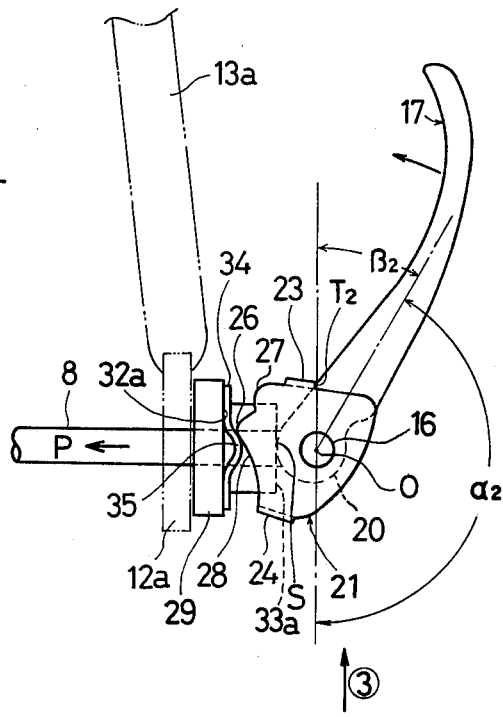
Figure 5:
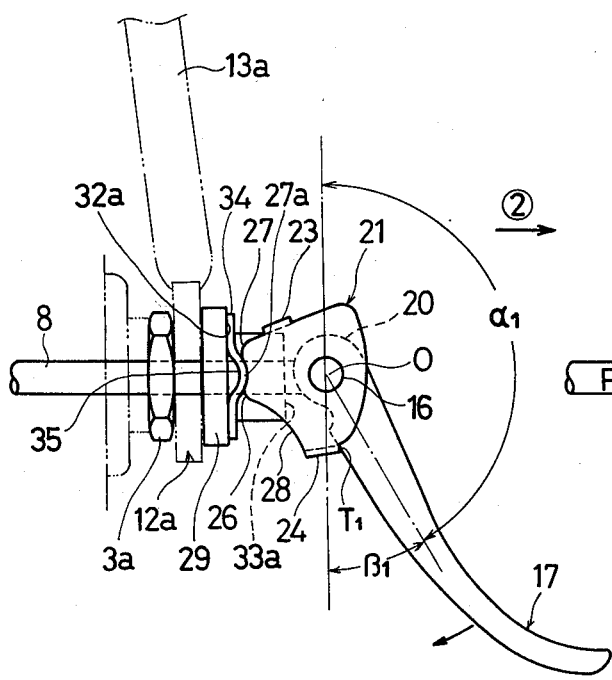

The releasing operation is carried out by turning the lever in order of the arrows ① - ② (FIGS. 3-5-6). More particularly, when the lever is turned for the predetermined angle $\alpha_1$, it gets in contact at ($T_1$) with the cross extensions 24 as shown in FIG. 5. If the turning of the lever is continued, the lever continues pushing the extensions 24 in the clockwise direction to force the nose points 26 of the member 21 to ride over the protruded portions 35 of the spring washer. By still continuing the turning of the lever until the distance between the points (O) and (S) is minimized as shown in FIG. 6, the releasing edge section 28 of the member 21 comes to face against the spring washer 34. Simultaneously therewith, the push member 29 is forced to slide outwardly by the function of the coil spring 38 to provide a clearance (C) between the fork end 12a and the member 29, resulting in that the spindle is permitted to axially slide back and forth (directions P, Q) within the distance of the clearance (C). This means that not only the distance ($D_2$) but also the distance ($D_1$) (FIG. 2) are slightly increased for releasing the fork ends 12a,12b. As a result, the hub can be easily detached from the fork ends 12a,12b by a single turning operation of the lever for about 180°.

As will be easily comprehensible, when the nose points 26 ride over the pair of protruded portions 35 on the way indicated by the arrow ② (FIGS. 5-6), the spring washer 34 is subjected to such a considerable depressive force exerted by the nose points 26 that the washer 34 can be elastically deformed into a substantially flat shape. In other words, the considerable force as above-mentioned is required for turning the lever from the position of FIG. 5 to the position of FIG. 6. Thus, the hub is prevented from an unexpected disengagement from the fork ends 12a,12b unless a certain unexpected external force, which is greater than the above-mentioned considerable force, is imparted to the lever in the clockwise direction. Further, in contrast to the prior art device, the hub can be held in the clamping condition until the lever is turned over the angle $\alpha_1$, as shown in FIG. 5.

The re-attaching operation of the hub is performed by turning the lever in order of the arrows ③ - ④ (FIGS. 6-4-3). More particularly, when the lever is turned for the predetermined angle $\alpha_2$ (for example 140°κ145°), it comes into contact at ($T_2$) with the cross plate 23. By giving a further turning for angle $\beta_2$ (FIG. 4), the actuating member 21 is forced to turn in the counter-clockwise direction by means of the cross plate 23, so that the nose points 26 are forced to ride over the protruded portions 35 of the spring washer 34. At the same time, the cam surfaces 20 urge the end wall 33a axially inwardly (in the direction of the arrow P), resulting in that the lever 17 and the member 21 are returned to their clamping position as shown in FIG. 3.

FIGS. 7 to 12 illustrate a modification (second embodiment) of the invention, in which identical reference numerals are used throughout FIGS. 1 to 12 inclusive to indicate identical or substantially identical elements. The second embodiment as illustrated in FIGS. 7 to 12 is substantially the same as the preceding embodiment as illustrated in FIGS. 1 to 6, in construction, arrangement, and function of each of the constituent elements, except that a further washer, preferably in the form of a cup washer 39, which is not employed in the preceding embodiment, is incorporated in the second embodiment for cooperation with a modified spring washer 34', and by the employment of the cup washer 39, several minor changes in construction and operation are invited as will be described hereinafter.

The cup washer 39 may preferably have a disk portion 40 and a hollow, short cylindrical portion 41 formed integral with the disk portion 40 and extending inwardly therefrom toward the push member 29. The disk portion 40 has a smooth outer wall 42 and a circular hole 43 formed therein, whose internal diameter is slightly larger than the external diameter of the reduced cylindrical section 33 of the member 29, so that the cup washer can be axially slidably mounted on the section 33. The internal diameter of the hollow cylindrical portion 41 is slightly larger than the external diameter of the enlarged section 32 of the member 29, so that the section 32 can axially slide into and out of the portion 41.

The modified spring washer may, for example, be a corrugated washer 34' which has three outwardly protruded portion 44 spaced from each other at an equal angular internal, and is deformable into a substantially flat shape when compressed. The washer 34' has a circular through hole 45 whose internal diameter is slightly larger than the external diameter of the cylindrical reduced section 33 of the push member 29, so that the washer 34' can be axially slidably mounted on the section 33. Different from the spring washer 34 employed in the preceding embodiment, the modified spring washer 34' may be rotatable with respect to the cylindrical section 33. Therefore, a flat side wall as shown at 33a in FIG. 1 and a hole of the specific configuration as shown at 37 in FIG. 1 are no longer required in the second embodiment.

Figure 8:
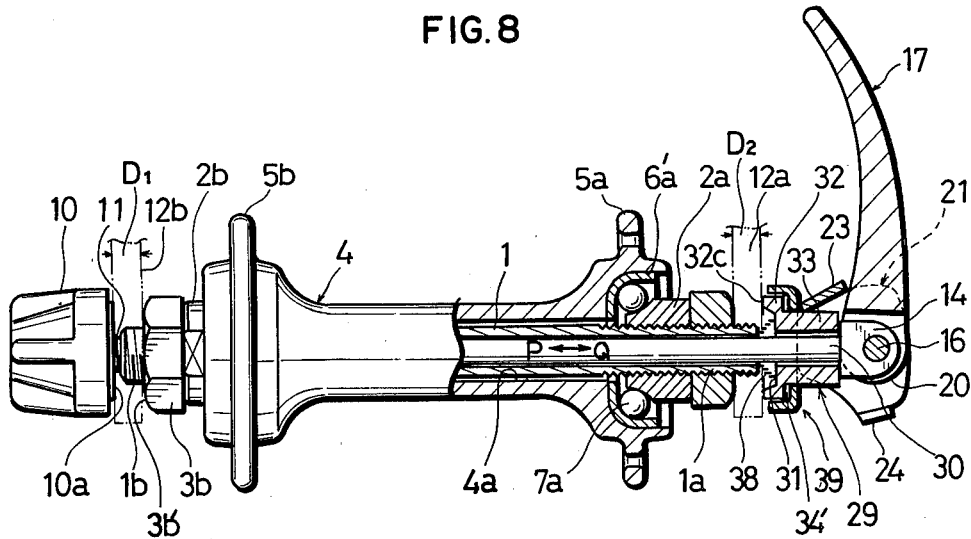
FIG. 8 is an elevational view, partly in section, of the hub of FIG. 7.

When the hub is assembled as shown in FIG. 8, the corrugated spring washer 34' is sandwiched between the annular wall 32a of the member 29 and the internal wall 46 (FIG. 9), while the reduced cylindrical section 33 projects through the hole 45 of the washer 39 so that the end wall 33a can be in contact with the cam surfaces 20 of the lever 17. Since the spring washer 34' can be disposed within the cup washer 39 and is not visible from outside, a better appearance is obtained as compared to the preceding embodiment in which the spring washer 34 is visible from outside as shown in FIGS. 2 to 6.

In operation, the spring washer 34' is not directly compressed by the actuating member 21 but indirectly compressed through the disk portion 40 of the cup spring 19. Since no disadvantage is invited by such arrangement that the push member 29 is rotatable, it is no longer necessary to provide a recess as shown at 27a in FIGS. 1 and 3 to 6 with each of the side plates 22 of the member 21. Incidentally, reference numeral 6a' in FIG. 8 designates a known bearing cup for forming a raceway, which is prepared separately from and coupled into the hub shell 4.

Figure 9:
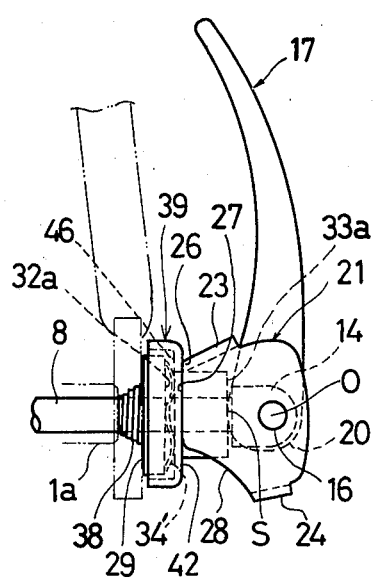
FIGS. 9 to 12 are schematic illustrations showing operational stages of the hub of FIG. 7.

In operation, when the lever 17 is in its clamping position, the spring washer 34' is held compressed between the wall 32a of the push member 29 and the internal wall 46 of the cup washer 39, as shown in FIG. 9. Thus, the cup washer 39 is forcibly pressed against the edge sections 27 of the member 21 by the function of the compressed spring washer 34', so that the member 21 is held in the position of FIG. 9 unless the lever 17 is turned excessively over a predetermined range of angle $\alpha_1$ (FIG. 11), for example, over 150°. In other words, in the case where the lever is unexpectedly turned in less than the predetermined angle $\alpha_1$, the member 21 can be held stationary in position even if the cam surfaces 20 get out of contact with end wall 33a as shown in FIG. 11, with the result that the fork end 12a remains tightly sandwiched between the member 29 and the lock nut 3a while the other fork end 12b also remains tightly sandwiched between the nuts 10 and 3b.

Figure 10:
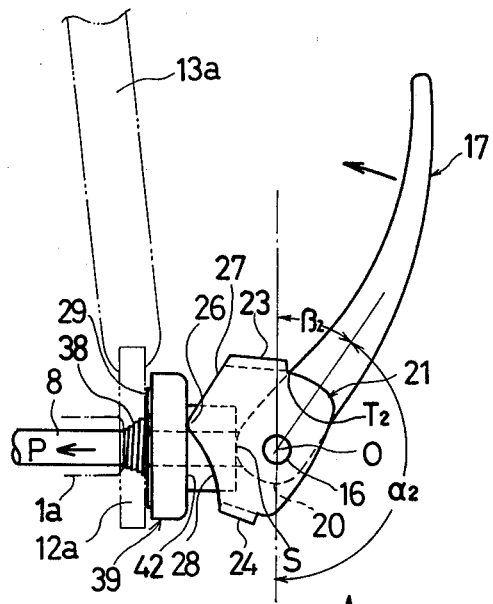
Figure 11:
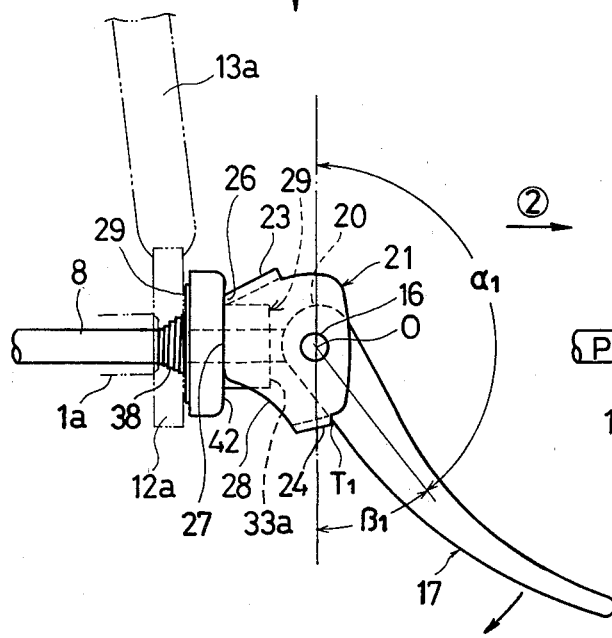
Figure 12:
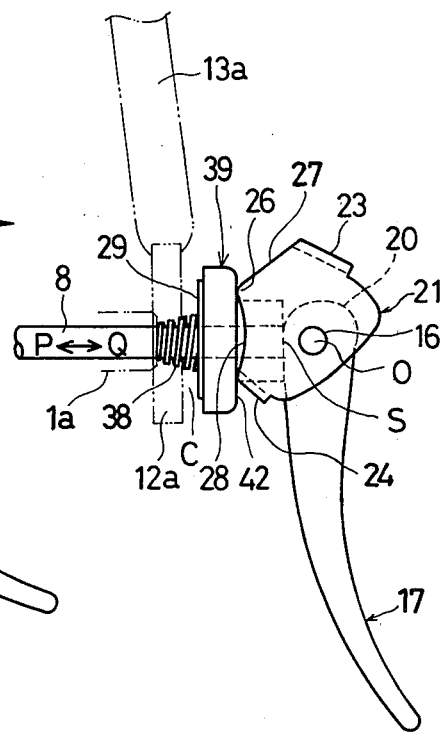

The releasing operation is carried out by turning the lever in order of the arrows ① - ② (FIGS. 9-1-0-11). More particularly, when the lever is turned for the predetermined angle $\alpha_1$, it gets in contact at (T$_1$) with the cross extensions 24 as shown in FIG. 11. If the turning of the lever is continued, the lever continues pushing the extensions 24 in the clockwise direction to force the nose points 26 of the member 21 to slide on the smooth surface wall 42 of the cup washer 39. By still continuing the turning of the lever until the distance between the points (O) and (S) is minimized as shown in FIG. 12, the releasing edge section 28 of the member 21 comes to face against the surface wall 42 of the cup washer 39 as shown in FIG. 12. Simultaneously therewith, the push member 29 is forced, together with the cup washer 39, to slide outwardly by the function of the coil spring 38 to provide a clearance (C) between the fork end 12a and the member 29, resulting in that the spindle is permitted to axially slide back and forth (directions P, Q) within the distance of the clearance (C) in order to slightly increase not only the distance (D$_2$) but also the distance (D$_1$) (FIG. 8) for releasing the fork ends 12a, 12b. As a result, the hub can be easily detached from the fork ends 12a, 12b by a single turning operation of the lever for about 180°.

As will be easily comprehensible, on the way where the nose points 26 are shifted as indicated by the arrow ② (FIGS. 11-12), such a considerable depressive force is applied to the washer 34' via the washer 39 by the nose points 26, that the washer 34' can be elastically deformed into a substantially flat shape. In other words, the considerable force as above-mentioned is required for turning the lever from the position of FIG. 9 to the position of FIG. 12. Thus, the hub is prevented from an unexpected disengagement from the fork ends 12a, 12b unless a certain unexpected external force, which is greater than the above-mentioned considerable force, is imparted to the lever in the clockwise direction.

The re-attaching operation of the hub is performed by turning the lever in order of the arrows ③ - ④ (FIGS. 13-10-9). More particularly, when the lever is turned for the predetermined angle $\alpha_2$ (for example 140°κ145°), it comes into contact at (T$_2$) with the cross plates 23. By giving a further turning for angle $\beta_2$ (FIG. 10) to the lever, the actuating member 21 is forced to turn in the counter-clockwise direction by means of the cross plate 23, so that the edge section 27 is forcibly shifted to come into pressing contact with the outer wall 42 of the washer 39, with the result that the spring washer 34' is held compressed by the walls 32a and 46. At the same time, the cam surfaces 20 urge the end wall 33a axially inwardly (in the direction of the arrow P), resulting in that the lever 17 and the member 21 are returned to their clamping position as shown in FIG. 9.

The present invention being thus described, it will be obvious that same may be varied in many ways. Such variations are not to be regarded as a departure from the spirit and scope of the present invention, and all such modification as would be obvious to one skilled in the art are intended to be included within the scope of the following claims.

I claim:

1. A quick-release type hub for bicycles comprising a stationary tubular hub axle for rotatably supporting a hub shell, a first and a second lock nuts each mounted on opposite end sections of said axle, respectively, a spindle, which is longer than said axle, extending through said axle, and projecting at opposite ends out of said axle, said spindle being axially slidable with relative to said axle, and having a threaded end section on which an adjusting nut is mounted, and a non-threaded end section which is formed with an enlarged head having a through hole extending transversely of a longitudinal axis of said spindle, a support pin extending through said through hole and projecting at opposite ends from said hole, a push member which is axially slidably mounted on said non-threaded end section, said push member having an enlarged section and a reduced section which extends from said enlarged section toward said head, a lever pivotally mounted at its one end on said support pin, said one end of the lever having at least one circumferential cam surface so shaped that a distance from said pin gradually varies and arranged so as to act on an end wall of said reduced section, said lever being rotatable between a clamping position and a releasing position an actuating member mounted on said support pin so as to be co-axially rotatable with said lever, said actuating member including a pair of spaced side plates each having an inward edge separated by a nose point into a clamping edge section and a releasing edge section, a first actuator means disposed adjacent said clamping edge section so as to come into contact with said lever as the latter is turned to its clamping position, and a second actuator means disposed adjacent said releasing edge section so as to come into contact with said lever as the latter is turned to its releasing position, a coil spring interposed between said push member and one end of said axle for urging the push member axially outwardly, a spring washer mounted on said reduced section of the push member and interposed between said enlarged section of the push member and said inward edge of the actuating member, said spring washer being elastically deformable into a substantially flattened shape when compressed, said push member being prevented from sliding axially outwardly as long as said clamping edge section of the actuating member is in contact with said spring washer when the hub is mounted on a bicycle, and said spindle being axially slidable only when said releasing edge section of the actuating member is in contact with said spring washer when the hub is mounted on a bicycle.

2. The bicycle hub as defined in claim 1, which includes
a cup washer mounted on said reduced section of said push member and interposed between said spring washer and said inward edge of said actuating member.

3. The bicycle hub as defined in claim 1 or 2, wherein said spring washer has at least two spaced protruded portions.

4. The bicycle hub as defined in claim 1, wherein
said spring washer has a pair of spaced protruded portions, and
each of said clamping edge sections of the actuating member has a recess formed so as to be engageable and disengageable with one of said protruded portions.

5. The bicycle hub as defined in claim 2, wherein
said spring washer is a corrugated washer and disposed within said cup washer.

6. The bicycle hub as defined in claim 1 or 2, wherein
said enlarged section of said push member has an inner wall which is serrulated.

7. The bicycle hub as defined in claim 1, wherein
said first actuater means of the actuating member is in the form of a cross plate connected at both ends to said pair of spaced side plates.

8. The bicycle hub as defined in claim 1, wherein
said second actuater means is in the form of at least one cross extension extending from one of said pair of spaced side plates.

* * * * *